United States Patent
Lorca Hernando

(10) Patent No.: US 9,198,187 B2
(45) Date of Patent: Nov. 24, 2015

(54) METHOD TO MINIMIZE INTER-CELL INTERFERENCE IN A LTE DEPLOYMENT

(71) Applicant: Telefonica, S.A., Madrid (ES)

(72) Inventor: Francisco Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 64 days.

(21) Appl. No.: 14/345,848

(22) PCT Filed: Sep. 18, 2012

(86) PCT No.: PCT/EP2012/068315
§ 371 (c)(1),
(2) Date: Mar. 19, 2014

(87) PCT Pub. No.: WO2013/041512
PCT Pub. Date: Mar. 28, 2013

(65) Prior Publication Data
US 2014/0220990 A1    Aug. 7, 2014

(30) Foreign Application Priority Data
Sep. 19, 2011    (ES) .................................. 201131510

(51) Int. Cl.
*H04W 72/08* (2009.01)
*H04J 11/00* (2006.01)
*H04L 5/00* (2006.01)
(Continued)

(52) U.S. Cl.
CPC ........... *H04W 72/082* (2013.01); *H04J 11/005* (2013.01); *H04L 1/0026* (2013.01); *H04L 5/0048* (2013.01); *H04L 5/0053* (2013.01); *H04L 5/0073* (2013.01); *H04L 5/0082* (2013.01); *H04L 25/0204* (2013.01); *H04L 25/0224* (2013.01); *H04L 1/0067* (2013.01);
(Continued)

(58) Field of Classification Search
CPC .................................................... H04W 72/082
See application file for complete search history.

(56) References Cited

U.S. PATENT DOCUMENTS 7,167,506 B2 *   1/2007   Baltersee et al. ............. 375/148
2009/0034437 A1   2/2009   Shin et al.
(Continued)

FOREIGN PATENT DOCUMENTS

WO   2010/024743 A1   3/2010
WO   2011/085399 A1   7/2011

OTHER PUBLICATIONS

Coordinated Multiple Points Transmission for LTE-Advanced Systems, Wireless Communications, Networking and Mobile Computing, 2009. WiCom '09. 5th International Conference on, Issue Date: Sep. 24-26, 2009, Written by: Wang, Qixing; Jiang, Dajie; Liu, Guangyi; Yan, Zhigang.*

(Continued)

*Primary Examiner* — Vladimir Magloire
*Assistant Examiner* — David Orange
(74) *Attorney, Agent, or Firm* — Sughrue Mion, PLLC

(57) ABSTRACT

In the method, a user device detects interferences a single dominant interferer of a neighbor base station, said user device provided with at least two antennas and said user device connected to a main base station, said main base station introducing a pattern of transmission gaps for certain Resource Elements in the Resource Element mapping function by switching off the transmission, being said certain Resource Elements in the Resource Element mapping function introduced for the PDSCH complex symbols.

11 Claims, 4 Drawing Sheets

(51) Int. Cl.
*H04L 25/02* (2006.01)
*H04L 1/00* (2006.01)
*H04W 72/00* (2009.01)

(52) U.S. Cl.
CPC ............. *H04L 5/0062* (2013.01); *H04L 5/0091* (2013.01); *H04W 72/00* (2013.01)

(56) References Cited

U.S. PATENT DOCUMENTS

| | | |
|---|---|---|
| 2009/0116568 A1 | 5/2009 | Lindoff et al. |
| 2009/0268630 A1 | 10/2009 | Yellin et al. |
| 2010/0034077 A1* | 2/2010 | Ishii et al. .................... 370/210 |
| 2010/0167653 A1* | 7/2010 | Kim et al. .................... 455/63.1 |
| 2013/0033998 A1* | 2/2013 | Seo et al. ...................... 370/252 |
| 2013/0266100 A1* | 10/2013 | Gomadam et al. ............ 375/346 |

OTHER PUBLICATIONS

International Search Report of PCT/EP2012/068315 dated Jan. 11, 2013.

* cited by examiner

METHOD TO MINIMIZE INTER-CELL INTERFERENCE IN A LTE DEPLOYMENT

CROSS REFERENCE TO RELATED APPLICATIONS

This is a National Stage of International Application No. PCT/EP2012/068315 filed Sep. 18, 2012, claiming priority based on Spanish Patent Application No. 201131510 filed Sep. 19, 2011, the contents of all of which are incorporated herein by reference in their entirety.

FIELD OF THE ART

The present invention generally relates to a method to minimize inter-cell interference in a LTE deployment, wherein a user device detects interferences of at least a single dominant interferer of a neighbour base station, said user device provided with at least two antennas and said user device connected to a main base station, and more particularly to a method that comprises introducing a pattern of transmission gaps for certain Resource Elements in the Resource Element mapping function for the PDSCH complex symbols by switching off the transmission of said main base station for said certain Resource Elements, calculating channel characteristics of said single dominant interferer by means of said certain Resource Elements and employing said calculation to at least partially cancel said single dominant interferer.

PRIOR STATE OF THE ART

Long-Term Evolution (LTE) is the next step in cellular 3G systems, which represents basically an evolution of the actual mobile communications standards, such as UMTS and GSM [2]. It is a 3GPP standard that provides throughputs up to 50 Mbps in uplink and up to 100 Mbps in downlink. It uses scalable bandwidth from 1.25 to 20 MHz in order to suit the needs of network operators that have different bandwidth allocations. LTE is also expected to improve spectral efficiency in networks, allowing carriers to provide more data and voice services over a given bandwidth.

LTE-Advanced (LTE-A), an evolution of LTE, is being standardized in LTE Release 10 and beyond. It is aimed at fulfilling IMT-Advanced requirements, whose capabilities go beyond those of IMT-2000 and include enhanced peak data rates to support advanced services and applications (100 Mbps for high mobility, and 1 Gbps for low mobility) [5].

Orthogonal Frequency Division Multiple Access (OFDMA) is specified as the downlink multiple access scheme in 3GPP LTE and LTE-A, which divides the available bandwidth into multiple narrow orthogonal frequency bands [3]. Thus, there is no ISI (Inter-Symbol Interference) within the cell boundary. For the uplink, Single-Carrier Frequency Division Multiple Access (SC-FDMA) is defined, which may be considered similar to OFDMA but with an additional Discrete-Fourier Transform (DFT), which spreads the symbols prior to modulation and achieves a lower Peak-to-Average Power Ratio (PAPR), thus improving the efficiency of the power amplifiers. Both OFDMA and SC-FDMA allow the base station (known as eNodeB) to assign different blocks of time and frequency to the users in a cell.

Since radio spectrum has long been deemed the most scarce resource, advanced radio resource management (RRM) schemes that can increase the OFDMA network capacity and reduce the deployment costs has been in dire demand. The need for such an RRM algorithm becomes even more acute today, as the number of subscribers continues to experience unprecedented growth globally and the amount of sheer volume of traffic increases incessantly.

One conventional approach to improve spectrum efficiency is to reuse the same frequency band in multiple geographical areas or cells. However, inter-cell interference (ICI) will be inevitably incurred, when user equipments (UEs) in adjacent cells share the same spectrum. Since ICI is the major performance-limiting issue in wireless cellular networks, a good interference management scheme that can mitigate ICI is a central part of RRM.

Inter-cell interference is one of the main problems in terms of performance for LTE and LTE-A (as happens with other OFDM systems). If the frequency resource is universally reused in every cell of the network, the users at the cell edge inevitably will have the weakest signal strength, and will suffer the most from inter-cell interference. A frequency re-use of one or close to one implies that the base stations in neighbour cells could transmit on all available time-frequency resource blocks (PRBs) simultaneously. Due to transmit power limitations in mobile terminals, the constraint on the uplink link budget may imply the need for smaller cell sizes than the ones typically deployed for actual networks, increasing the network deployment cost.

In order to achieve interference mitigation there are several possible techniques. One of the most studied techniques is what is known as Inter-cell Interference Coordination (ICIC). Based on measurements performed by the UE and communicated to the eNodeB (CQI, path loss, average interference, etc.), and on measurements performed by different network nodes and exchanged between them through X2 interface, a better downlink allocation can be done to mitigate interferences.

One simple solution is a reuse-3 system, as it will be shown in FIG. 1. Three neighbour cells use orthogonal frequency bands, each equal to one-third of the total bandwidth. This eliminates the strongest ICI at the cost of reduced spectral efficiency, as only one-third of the bandwidth is used in each cell [14].

Fractional Frequency Reuse (FFR) may also be employed [4]. It consists in applying restrictions on the resource manager and on transmit power in a coordinated manner among the cells, so that only a part of the frequency spectrum is available at the cell edge, which is orthogonal in adjacent cell edges, while the whole spectrum is available at the cell centre where transmission is power limited to reduce interference with cell edge users. In other cases, FFR is achieved by reserving for the cell edge users a primary band with a re-use pattern of ⅓, served by high-power transmission, and a secondary band for cell centre users with the remaining spectrum and power. This will be illustrated in FIG. 2.

Both solutions are in general complicated to manage, and there is not a consensus built on the benefits that this functionality can provide. Moreover, it is currently open on 3GPP a Work Item focused on an enhanced version of the ICIC mechanism (eICIC).

One alternative strategy is to reduce the inter-cell interference with the help of cooperative transmission. Cooperative Multipoint (CoMP) transmission and reception is a framework that refers to a system where several geographically distributed antenna nodes cooperate with the aim of improving the performance of the users served in the common cooperation area. Most of the CoMP approaches share the requirement of needing some scheduling information that must be shared among the base stations, thus very-low-latency links are required so that information can be exchanged between coordinated nodes in the order of milliseconds. Therefore, CoMP solutions require tight coordination for transmission and reception and/or tight time synchronization, and are thus complex and challenging.

There also exist other solutions to overcome interference at the cell-edge. In [11] it is proposed a method that involves measuring interference power from one or more neighbour BSs, determining cooperative interference cancellation-related information for each neighbour BS, and feeding back that information to the serving BS. The serving BS provides the corresponding neighbour BSs with the relevant cooperative cancellation-related information. Hence this scheme is very complex as it involves a tight cooperation between eNodeBs and expensive computational capabilities at the UE.

Other schemes are based on Successive Interference Cancellation Receivers (SIC). In [12] an iterative parallel interference canceller (PIC) performs a recursive interference cancellation across several correlated subbands and several receive antenna elements. This procedure suffers the drawback of requiring large computational capabilities for the UE's receiver. In [13] an iterative interference cancellation mechanism involves detecting a number of interfering signals, sorting the data streams based on a predetermined criteria, decoding one data stream and removing interference from the other independent data streams. This procedure is again computationally very expensive.

In [15] a mechanism for transmitting and receiving signals in the same radio resources through interference cancellation in a multi-hop relay communication system is provided, hence minimizing inter-cell interference as the present invention does. Even though in [15] transmission gaps are also introduced, as the present invention does, for certain Resource Elements, [15] it is not used in an LTE deployment employing PDSCH, neither the user device has at least two antennas or the interference is from a neighbour base station. Therefore, [15] cannot reduce inter-cell interference in LTE networks when the mobile is in cell-edge conditions in a simple way.

DESCRIPTION OF THE INVENTION

It is necessary to offer an alternative to the state of the art which covers the gaps found therein, particularly related to the lack of proposals which really allows mitigating inter-cell interference in LTE networks in an efficient and simple way when the mobile phone is in cell-edge conditions.

To that end, the present invention provides a method to minimize inter-cell interference in a LTE deployment, wherein a user device detects interferences of at least a single dominant interferer of a neighbour base station, said user device provided with at least two antennas and said user device connected to a main base station.

On contrary to the known proposals, the method of the invention, in a characteristic manner it comprises performing the following mechanism:
introducing a pattern of transmission gaps for certain Resource Elements in the Resource Element mapping function for the PDSCH complex symbols by switching off the transmission of said main base station for said certain Resource Elements;
calculating, said user device, channel characteristics of said single dominant interferer by means of said certain Resource Elements; and
employing said calculation to at least partially cancel said single dominant interferer.

Other embodiments of the method of the first aspect of the invention are described according to appended claims 2 to 13, and in a subsequent section related to the detailed description of several embodiments.

BRIEF DESCRIPTION OF THE DRAWINGS

The previous and other advantages and features will be more fully understood from the following detailed description of embodiments, with reference to the attached drawings (some of which have already been described in the Prior State of the Art section), which must be considered in an illustrative and non-limiting manner, in which.

DETAILED DESCRIPTION OF SEVERAL EMBODIMENTS

This invention proposes a mechanism to reduce inter-cell interference on UEs having at least two antennas (which is a baseline capability for LTE terminals), suitable for transmission modes TM1 and TM7 in situations where there is a single dominant interferer, i.e. when the power levels of other interfering sources are significantly lower.

The proposed mechanism comprises:
1. A modification on the Resource Element (RE) mapping function for the PDSCH complex symbols, which will be called "IC RE mapping";
2. a procedure at the receiver such that a UE with at least two receive antennas will be able to partially cancel out the interference coming from the strongest neighbour eNodeB; and
3. a coordination between neighbour eNodeBs in order to ensure that no more than two eNodeBs transmit at the same time in the resource blocks in which the proposed invention is applied, and that the transmission modes for these REs are TM1 or TM7 (SISO).

The IC RE mapping function proposed in the present invention modifies the way in which PDSCH symbols are mapped, introducing a pattern of transmission gaps for certain REs. In these REs the transmitter from the desired eNodeB is switched off, and we may therefore refer to them as DTX resource elements. The DTX REs occupy two OFDM symbols in each subframe (one symbol for each slot), and are distributed along the Resource Blocks (RBs) previously scheduled for that user.

The UE, taking advantage of two receive antennas, makes use of the DTX REs in order to collect information about the channel characteristics of the neighbour interference as seen by the UE. By means of a concrete procedure, later described, the UE may partially cancel out the interference term provided that there is a single dominant interferer.

Coordination between cells is needed to ensure that no more than two base stations are simultaneously transmitting in the resource blocks in which the present invention is applied, and that the transmission mode for these neighbour eNodeBs is SISO (TM1 or TM7). The reason is that the proposed invention is capable of cancelling the interference coming from a single interfering eNodeB operating in SISO mode; hence coordination between cells must exist through e.g. X2 interface.

The restriction of using SISO implies that no transmit diversity is allowed in these REs. However this is not a serious drawback, because the advantage of cancelling the interference is clearly greater than the benefit provided by the Alamouti scheme, especially in situations with a poor geometric factor G where this invention makes sense.

Figure 1:
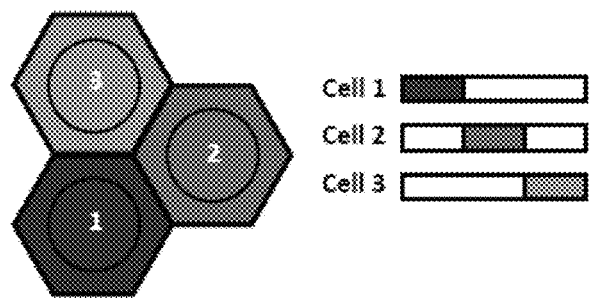
FIG. 1 shows current reuse-3 system used to eliminate inter-cell interference.
Figure 2:
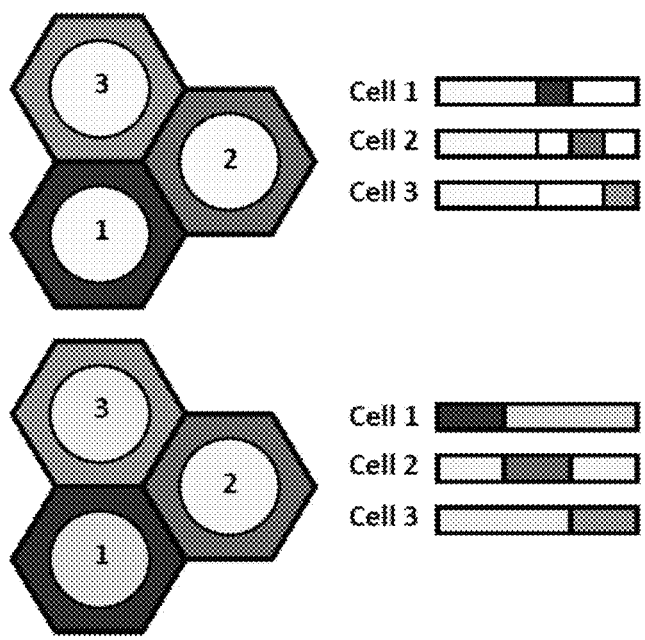
FIG. 2 shows Fractional Frequency Reuse system used to eliminate inter-cell interference.
Figure 3:
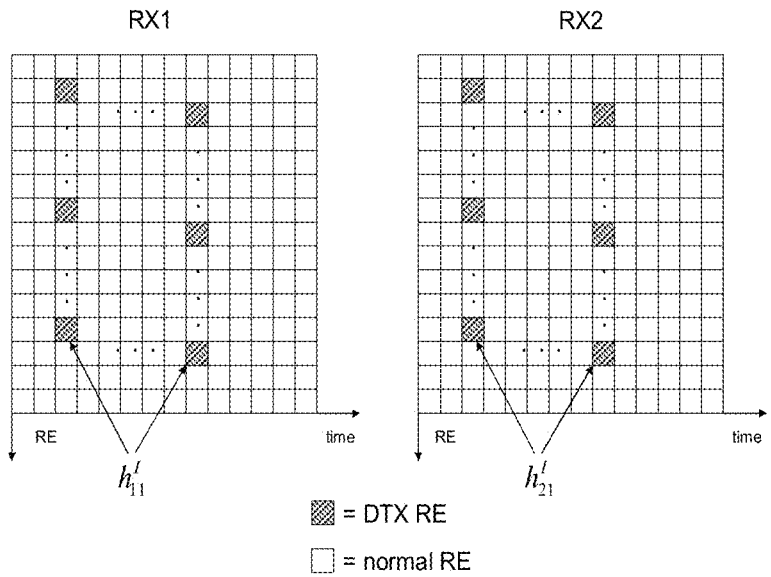
FIG. 3 shows schematically a possible pattern of gaps, according to an embodiment of the present invention.

FIG. 3 showed schematically a possible pattern of gaps. Normal REs are depicted as white squares, and DTX REs as striped squares. As the transmitter from the serving eNodeB is switched off at the DTX resource elements, the UE receives only interference, with channel coefficients $h_{11}{}^I$ and $h_{21}{}^I$ for receive antennas RX1 and RX2, respectively. It is possible to take advantage of this information in order to partially cancel out the interference along the frequency band of interest, as it will be later described.

The eNodeB is in charge of deciding whether or not to activate the proposed mechanism, which should be indicated to the UE by an appropriate control message or bit field in the PDCCH. When the UE reads the PDCCH, it derives the appropriate parameters to correctly demodulate the RBs containing the PDSCH symbols. If the eNodeB activates the proposed invention, the UE should be aware of this in order to take advantage of the new pattern of gaps created in the REs.

The proposed coordination between eNodeBs implies that a given set of RBs reserved for a cell-edge user can only be used simultaneously by two neighbour eNodeBs, being thus banned to other cells. This limitation is clearly less restrictive than usual ICIC schemes, in which e.g. entire zones of the spectrum are reserved for different cells, or a power constraint is introduced in order to reduce interference. Moreover, it is possible to limit the number of cells in which the restriction applies.

Figure 4:
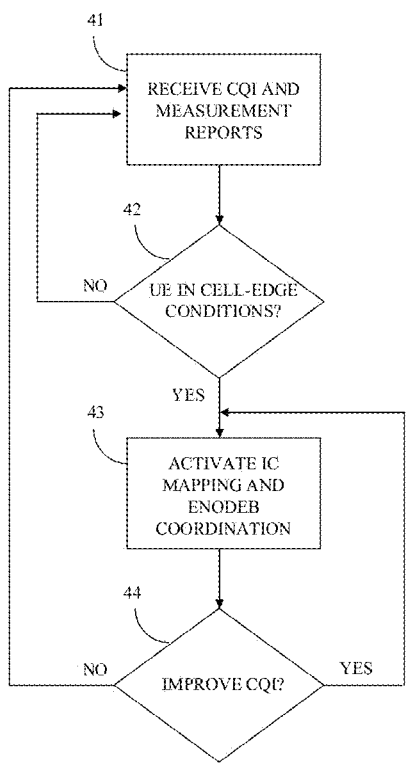
FIG. 4 shows a possible flow diagram of the method proposed in the present invention.

FIG. 4 showed a possible flow diagram for the proposed invention. The eNodeB receives measurement reports and channel quality indicators (CQI) from the UEs, through block 41. These measurements may be used to elucidate whether a strong interferer is near enough, e.g. by means of the CQI or the neighbour cell RSRP [9], although any other procedure may also be equally valid. If the eNodeB considers that the UE is near the cell edge (block 42), it may activate the proposed invention, informing the UE by means of a relevant control message or bit field in the PDCCH. The invention introduces a new IC mapping and coordination between cells to ensure that no other eNodeB is using those REs (block 43). The eNodeB then evaluates if the reception is improved, e.g. by monitoring the reported CQI values from that UE. If the CQI is not improved (block 44), or even gets worse, this may indicate that a different interference source is affecting the UE, so the system falls back to a normal mode of operation. If the CQI is improved, it keeps using the proposed IC mapping.

Any other flow diagram is possible, provided that the concepts described in the present invention are applied. This invention does not prefer the use of any algorithm over another for activating the proposed enhanced ICIC mechanism. Likewise, the detection of the conditions for the UE being in a cell-edge situation is implementation-dependent.

Interference Cancellation at the Receiver

The rationale for the proposed invention is as follows. Suppose that there is a UE with two receive antennas, with a desired eNodeB operating in SISO transmission mode (TM1 or TM7), and suffering from inter-cell interference coming from a strong neighbour cell. The signal received by the UE is the sum of a desired term coming from the serving eNodeB, a white Gaussian noise term (AWGN) and an interference term coming from a neighbour cell. Hence for each RX antenna the received complex symbols $r_1$, $r_2$ may be written:

$$r_1 = h_{11}{}^s s + h_{11}{}^I i + n_1$$

$$r_2 = h_{21}{}^s s + h_{21}{}^I i + n_2$$

In these equations s is the signal transmitted from the desired eNodeB, i the interference transmitted from the neighbour eNodeB, $n_1$ and $n_2$ the corresponding AWGN terms at each antenna port, and the different $h_{ij}$'s conform the frequency response components of both signal and interference:

$$H^S = \begin{pmatrix} h_{11}^S \\ h_{21}^S \end{pmatrix}$$

is the 2×1 channel matrix associated with the desired signal, $h_{11}{}^s$ and $h_{21}{}^s$ being the frequency response components as seen by antennas RX1 and RX2, respectively.

$$H^I = \begin{pmatrix} h_{11}^I \\ h_{21}^I \end{pmatrix}$$

is the analogous channel matrix associated with the interfering signal.

Usually the desired and interfering channel elements $h_{ij}$ are frequency dependent, with more or less variation in frequency depending on the coherence bandwidth of the channel: the greater the coherence bandwidth, the less dependence on frequency will be shown over the band of interest.

If DTX REs are inserted along an OFDM symbol, the desired signal will be null in them (s=0) and so the received signal will only have interference and noise terms:

$$r_1 = h_{11}{}^I i + n_1$$

$$r_2 = h_{21}{}^I i + n_2$$

Neglecting the AWGN terms $n_1$ and $n_2$, it is possible to obtain a complex factor relating the two interfering frequency response terms:

$$\frac{r_1}{r_2} \cong \frac{h_{11}^I}{h_{21}^I} = f$$

The estimation of this complex factor may be achieved in a more accurate way than with a simple quotient, e.g. by least squares (LS) or minimum mean squared methods (MMSE), in order to obtain the best estimate of f in the presence of Gaussian noise.

The complex factor f is in general frequency dependent, and hence by distributing the pattern of DTX REs along the RBs scheduled for the user it is possible to estimate f at all frequencies of interest. This is an analogous situation to the normal channel estimation in LTE, in which several techniques may be employed in order to reconstruct a complete transfer function at all the desired frequencies through use of the cell reference signals (through linear interpolation, Wiener filtering, MMSE, or any other technique).

Considering there is no other source of interference, it is thus possible to approximately cancel out the interference at all REs by obtaining a new decision variable r' from the simple operation:

$$r_1 - f \cdot r_2 = r'$$

Applying this operation to the non-DTX resource elements it is obtained:

$$r_1 - f \cdot r_2 = h_{11}{}^s s + h_{11}{}^I i - f(h_{21}{}^s s + h_{21}{}^I i) + n' = (h_{11}{}^s - f \cdot h_{21}{}^s) \cdot s + (h_{11}{}^I - f \cdot h_{21}{}^I) \cdot i + n',$$

where n' represents a combined noise term. As the last term in brackets is equal to zero, we obtain the desired signal s affected by an effective channel complex factor:

$$r' = (h_{11}{}^s - f \cdot h_{21}{}^s) \cdot s + n' = h_{\mathit{eff}} \cdot s + n'$$

The effective channel complex factor $h_{\mathit{eff}}$ is easily estimated with the aid of the cell or UE-specific reference signals. It is important to note that channel estimation through reference signals should be done after the interference cancelling operation described here, in order to estimate the effective resulting channel frequency response $h_{\mathit{eff}}$.

Applying this technique to the REs containing the PDSCH complex symbols it is possible to cancel out the interference, provided there are no other interference terms.

It is important to emphasize that no detailed knowledge of the interfering channel transfer functions is needed (which would not be possible, as the interfering symbols are unknown to the UE). Instead, thanks to the presence of two receive antennas and the relevant transmission gaps distributed along the symbol, only the relative factor between the two frequency responses is needed.

The case of having more than two antennas will be of advantage for reception, as usual MRC schemes may be applied [4]. The proposed procedure may be extended in a straightforward manner for any number of antennas.

For a UE equipped with four receive antennas (a baseline capability for LTE-Advanced), the additional two antennas may be used for receive diversity. $r_1, r_2, r_3$, will be denoted as the four complex signals received from antennas RX1, RX2, RX3 and RX4: $r_1 = h_{11}{}^s s + h_{11}{}^I i + n_1$
$r_2 = h_{21}{}^s s + h_{21}{}^I i + n_2$
$r_3 = h_{31}{}^s s + h_{31}{}^I i + n_3$
$r_4 = h_{41}{}^s s + h_{41}{}^I i + n_4$ Now the previously described procedure will be applied separately over pairs $(r_1, r_2)$ and $(r_3, r_4)$, obtaining the relative complex factors $f_{12}, f_{34}$ and the new variables:

$$r_1 - f_{12} \cdot r_2 = r_1'$$

$$t_3 - f_{34} \cdot r_4 = r_2'$$

The interference terms will have been removed in these new variables. Hence it is possible to apply a MRC combining technique obtaining:

$$\frac{r_1' h_{1,\mathit{eff}}^* + r_2' h_{2,\mathit{eff}}^*}{|h_{1,\mathit{eff}}|^2 + |h_{2,\mathit{eff}}|^2},$$

where $h_{1,\mathit{eff}}$ and $h_{2,\mathit{eff}}$ are the effective channel complex factors estimated with the aid of the cell or UE-specific reference signals. It is clear that one may extend this procedure to any number of receive antennas, simply grouping them in pairs and applying the proposed technique over each antenna pair so as to cancel out the corresponding interference terms.

Interference Cancellation IC RE Mapping

In order to estimate the complex factor f along the relevant transmission band, the DTX pattern should comprise the entire RB set scheduled for the user.

The DTX REs must be located at symbols where there is no collision with other cell reference signals or UE-specific reference signals. Thus, taking into account the location of these control signals [3], one possibility for the case of normal CP is to locate the DTX pattern in symbol 2 for the first slot of each subframe, and symbol 3 for the second slot. For the case of extended CP, the DTX pattern may be located at symbol 2 in all slots. Hence, denoting as I the symbols in which DTX pattern is present, we may write:

Case of Normal CP:

For even slots: I=2

For odd slots: I=3

Case of Extended CP:

I=2 for even and odd slots

In the frequency domain, the gaps must be distributed along the entire frequency band reserved for the user, there being a trade-off between accuracy of the interference estimation and amount of available resources for PDSCH. The DTX REs may be chosen to be six REs apart from one another, but staggered so that within a resource block the spacing between the gaps is just three REs (45 kHz).

Mathematically, if we denote the locations of the REs as (k, l), where k is the subcarrier number and l is the symbol number within the slot, the mapping of DTX REs shall be as follows:

$$k = 6m + (v + v_{\mathit{shift}}) \bmod 6$$

$$m = 2 \cdot RB_{min}, 2 \cdot RB_{min} + 1, \ldots, 2 \cdot (RB_{min} + N_{RB}) - 1$$

$$v = \begin{cases} 0 \text{ for even slots} \\ 3 \text{ for odd slots} \end{cases}$$

$$v_{\mathit{shift}} = N_{ID}^{\mathit{cell}} \bmod 6$$

$$l = \begin{cases} \text{for normal } CP & \begin{cases} l = 2 \text{ for even slots} \\ l = 3 \text{ for odd slots} \end{cases} \\ \text{for extended } CP: & l = 2 \text{ for all slots} \end{cases}$$

Here $RB_{min}$ and $N_{RB}$ denote the minimum resource block number and the number of resource blocks scheduled for the UE, respectively. The cell-specific frequency shift $v_{\mathit{shift}}$ is analogous to the corresponding frequency shift of the cell reference signals, thus preventing the DTX patterns of adjacent cells to coincide.

Figure 5:
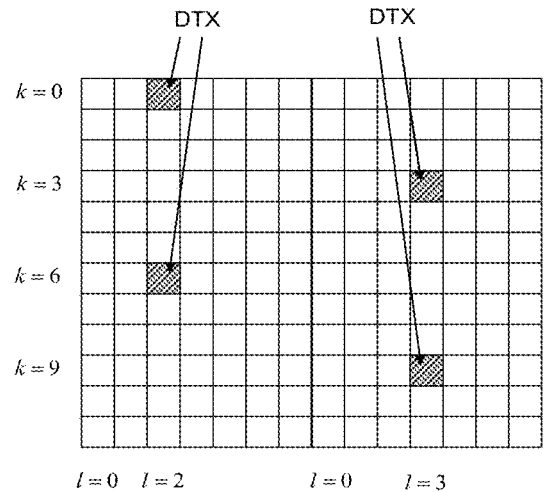
FIG. 5 shows the resulting pattern of gaps for normal Cyclic Prefix when performing the method proposed in the present invention.
Figure 6:
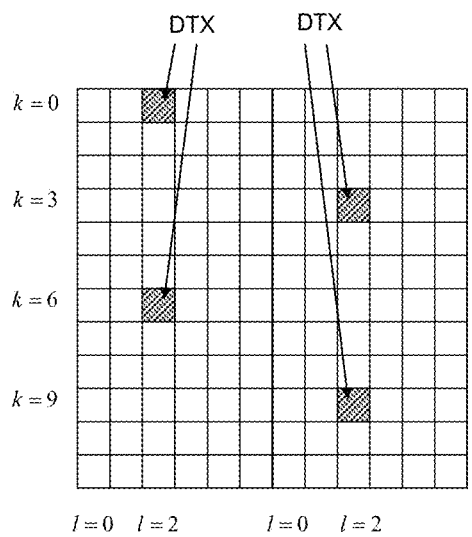
FIG. 6 shows the resulting pattern of gaps for extended Cyclic Prefix when performing the method proposed in the present invention.

FIGS. 5 and 6 showed the resulting pattern of gaps for normal and extended CP, respectively.

The rationale for the above chosen values is as follows. Reserving two symbols for each subframe means that the sampling frequency for interference estimation is 1/(0.5 ms)=2 KHz, and thus according to the Nyquist sampling theorem the maximum Doppler frequency will be equal to 1000 Hz. If the Doppler frequency is denoted by $f_d$, one obtains the maximum UE speed v with the aid of the following relation:

$$f_d = \frac{v}{c} f_c,$$

where $f_c$, is the carrier frequency and c the speed of light. For a 2.6 GHz carrier, a Doppler shift of 1000 Hz corresponds to a maximum speed of 415 km/h, near the highest speed supported for LTE (500 km/h) [10].

On the other hand, the relation between the coherence bandwidth and the channel delay spread is given by [4]:

$$B_{c,90\%} = \frac{1}{50\tau_{rms}},$$

where $\tau_{rms}$ is the channel delay spread and $B_{c,90\%}$ is the bandwidth where the autocorrelation of the channel in the frequency domain is 90%. In [8] the maximum considered delay spread is 991 ns, corresponding to $B_{c,90\%}$=20 kHz. Thus we see that the proposed spacing allows for the expected frequency-domain variations to be resolved.

On the other hand, the proposed values for the symbols l prevent the possibility of a collision with the other RS signals (cell reference signals and UE-specific reference signals).

The pattern of gaps should be applied only over those REs not reserved for transmission of any other control channels or signals, such as PBCH, PSS, SSS, positioning signals, and so on.

Coordination Between Neighbour Cells

For the proposed scheme to work properly, it is essential to ensure two things regarding interference:

1. Interference is dominated by a single source, i.e. other interfering sources should be received at the UE with negligible power levels (apart from AWGN).

2. Both desired and interfering eNodeBs operate in SISO mode (TM1 or TM7) when both of them use the same resource elements.

The first assumption has been considered throughout the previous subsections. The second assumption is implicitly considered in previous deductions in order to keep a single interfering symbol i in all the equations: if e.g. the interfering eNodeB operated in transmit diversity mode, there would be more than one interfering symbol at the receiver ($i_1$ and $i_2$) and hence:

$$r_1 = h_{11}{}^I i_1 + h_{12}{}^I i_2 + n_1$$

$$r_2 = h_{21}{}^I i_1 + h_{22}{}^I i_2 + n_2$$

In these equations it would be impossible to extract a single complex factor f relating the interfering frequency components. In fact, it is as though there were two interfering sources, with no chance for the UE to separate them. This situation should be avoided, because the UE will not be able to discriminate symbols $i_1$ and $i_2$ and hence it would not be possible to cancel out the interference.

The desired eNodeB could be allowed to employ a transmit diversity scheme, provided that the interfering one is strictly in SISO mode. However, it is advisable that it remains also in SISO mode so that UEs camping in a neighbour cell may also cancel out the interference it creates over them, by using the proposed invention. Hence, all eNodeBs should remain in SISO mode at the relevant high-interference resource elements.

One way to accomplish this is to coordinate eNodeBs so that, in those resource elements reserved for UEs in high-interference conditions, a maximum of two eNodeBs transmit simultaneously in TM1/TM7. This coordination may be achieved through X2 interface, by which eNodeBs exchange relevant traffic and control information. Based on CQIs and measurement reports from the UEs, the neighbour eNodeBs may ensure that no more than two SISO transmissions are simultaneously present.

Suppose that a given cell "A" reserves a set of REs for a cell-edge UE, and activates the proposed enhanced ICIC scheme. It thus informs its neighbours so that another subsequent use of those REs respects the rule of transmitting in TM1/TM7. Suppose again that one of those neighbour cells makes use of the involved REs (or any other REs which overlap with the former ones). Denoting this cell as "B", it shall:

1. Transmit in TM1/TM7 (SISO mode);
2. Introduce the IC RE mapping; and
3. Inform all neighbours of "A" and all neighbours of "B" about the relevant REs which will now be restricted for them, i.e. where subsequent transmissions shall not possible.

The cells formed by neighbours of cell "A" plus neighbours of cell "B" constitute a cluster in which no more cells will have the possibility of using those REs, apart from "A" and "B". If any of cells "A" or "B" stops using the relevant REs, it shall inform its own neighbours so that a different cell may again use them (using SISO and the proposed IC RE mapping). If both cells "A" and "B" stop applying the enhanced ICIC scheme, the REs will then be released for use by any other cell, thus repeating the process.

Nevertheless, any other coordination scheme may be possible provided it ensures that the same set of REs is used by not more than two neighbour cells in TM1/TM7.

Considerations on Downlink Rate Matching

The Rate Matching block, as specified in [7], is a constituent part of the multiplexing and channel coding processing chain. It is in charge of adjusting the bit rate output from the channel encoder (with fixed rate ⅓) to the available physical bit rate, which depends on the amount of resources allocated for a user.

If the proposed procedure is applied, the number of bits available for transmission of one transport block is reduced compared to the usual case of no IC RE mapping (for a given modulation scheme). This number is denoted as G in the LTE specifications [7]. When applying the proposed invention, the value of G according to [7] must be modified in order to take into account the special RE mapping operation.

The number of available bits depends on the symbol number and the precise location of the allocated PRBs. Regarding FIGS. 5 and 6, and denoting as $G_{eICIC}$ and $G_{normal}$ the number of available bits for transmission with and without the proposed procedure, respectively, it is haved:

$$G_{eICIC} = G_{normal} - 4 \cdot N_{RB} \cdot Q_m,$$

where $N_{RB}$ is the number of resource blocks for that user, and $Q_m$ is equal to 2 for QPSK, 4 for 16 QAM and 6 for 64 QAM.

The resulting value must be used in place of G in [7], so as to adapt the Rate Matching procedure to the proposed invention.

It is apparent that the proposed invention increases the coding rate, as the amount of available physical resources is reduced. However the reduction in available resources is only 4 REs per resource block, which represents only 2.4% increase in code rate, and may therefore be considered negligible.

Figure 7:
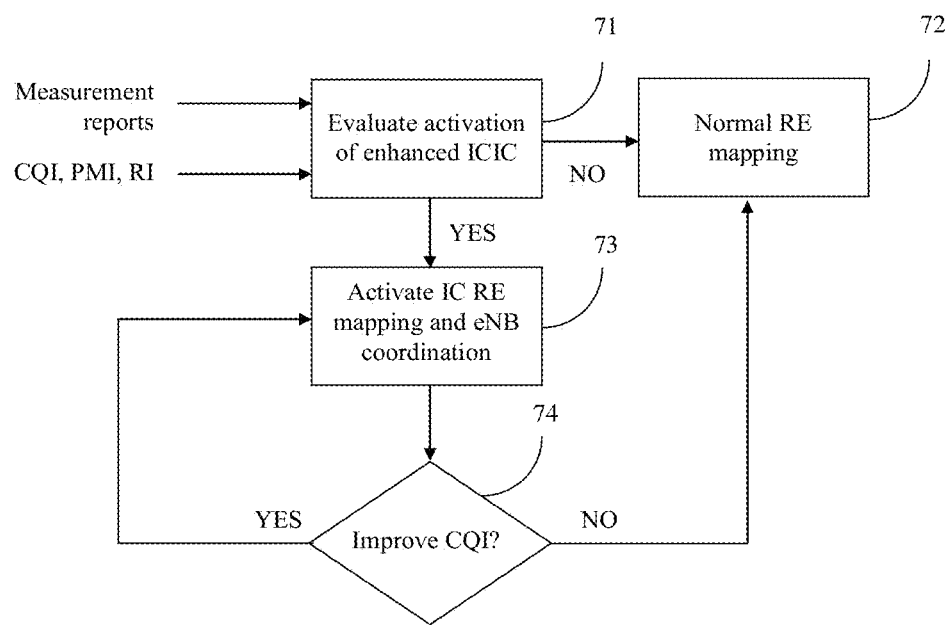
FIG. 7 shows a preferred embodiment of the present invention.

For a preferred embodiment of the present invention, as shown in FIG. 7, the system evaluates the need to switch to the proposed enhanced ICIC scheme in block 71, for a particular UE. This evaluation may be based upon the measurement reports received from the UEs, the channel quality values as measured by CQI, PMI and RI reports, or any other proprietary mechanism.

If the system activates the proposed invention, it shall inform the UE by means of an appropriate control message (block 73). This message may be contained in the PDCCH, along with information needed to demodulate the PDSCH, but any other mechanism is possible. The IC RE mapping function involves a modification on the Rate Matching block in the downlink processing chain [7], as well as on the Resource Mapping block [3]. Additionally, coordination between that cell and its neighbours should ensure that no more than one interfering source is present at the REs considered, and that transmission mode is TM1 or TM7.

The eNodeB may monitor the result of the proposed enhanced ICIC, in order to check if there is an improvement on the CQI values (block 74). If that is not the case, the procedure is not beneficial and this could indicate the presence of an interferer of a different nature, so the system falls back to a normal scheme (block 72).

The blocks depicted in FIG. 7 may be implemented as a collection of software elements, hardware elements, firmware elements, or a combination of them.

Advantages of the Invention

The proposed invention tackles the problem of inter-cell interference in LTE-Advanced, which is the main limiting factor for cell-edge users. Usual ICIC solutions are complicated to manage and its benefits are not clear. Other solutions, such as Interference Cancellation Receivers, require expensive computational capabilities. The proposed solution is a simple way of partially cancelling out interference coming from a neighbour cell, at the cost of minimal complexity increase in the UEs and some coordination between eNodeBs.

The proposed coordination scheme is less restrictive than usual ICIC schemes, and the procedure for cancelling interference at the UE is very simple and does not need for additional hardware elements apart from two receive antennas, which is a baseline capability for LTE terminals.

The interference reduction results in an increased capacity per cell, leading to a higher throughput and hence increased revenues. Moreover, the quality of experience is also enhanced, as each user may receive the desired signal with better conditions.

On the other hand, cell-edge behaviour determines global coverage, and therefore the number of eNodeBs which are needed for a particular deployment. An increased coverage zone implies a reduction on the number of eNodeBs, with a direct impact on CAPEX and OPEX.

A person skilled in the art could introduce changes and modifications in the embodiments described without departing from the scope of the invention as it is defined in the attached claims.

Acronyms

3GPP Third Generation Partnership Project
AWGN Additive White Gaussian Noise
CAPEX Capital Expenditure
CoMP Cooperative Multipoint
CP Cyclic Prefix
CQI Channel Quality Indicator
DTX Discontinuous Transmission
FFR Fractional Frequency Reuse
GSM Global System for Mobile Communications
IC Interference Cancellation
ICI Inter-Cell Interference
ICIC Inter-Cell Interference Coordination
IMT International Mobile Telecommunications
ISI Inter-Symbol Interference
LS Least Squares
LTE Long-Term Evolution
LTE-A Long Term Evolution-Advanced
MIMO Multiple-Input Multiple-Output
MMSE Minimum Mean Squared Error
MRC Maximal Ratio Combining
OFDMA Orthogonal Frequency-Division Multiple Access
OPEX Operational Expenditure
PAPR Peak to Average Power Ratio
PDCCH Physical Downlink Control Channel
PDSCH Physical Downlink Shared Channel
PIC Parallel Interference Cancellation
PMI Precoding Matrix Indicator
PRB Physical Resource Block
RE Resource Element
RI Rank Indicator
RS Reference Signal
RRM Radio Resource Management
RSRP Reference Signal Received Power
SC-FDMA Single-Carrier Frequency Division Multiple Access
SIC Successive Interference Cancellation
SISO Single-Input Single-Output
TM Transmission Mode
UE User Equipment
UMTS Universal Mobile Telecommunication System

REFERENCES

[1] Patent Definition. http://en.wikipedia.org/wiki/Patent
[2] 3GPP TS 36.300, Evolved Universal Terrestrial Radio Access (E-UTRA) and Evolved Universal Terrestrial Radio Access Network (E-UTRAN); Overall Description, Stage 2 (Release 8)
[3] 3GPP TS 36.211, Evolved Universal Terrestrial Radio Access (E-UTRA); "Physical Channels and Modulation (Release 10)"
[4] S. Sesia, I. Toufik, M. Baker (editors), "LTE, the UMTS Long Term Evolution: From Theory to Practice", John Wiley & Sons, 2009
[5] http://www.3gpp.org/LTE-Advanced
[6] R. Y. Chang, Z. Tao, J. Zhang, C. C. Jay Kuo, "A Graph Approach to Dynamic Fractional Frequency Reuse (FFR) in Multi-Cell OFDMA Networks", IEEE ICC 2009
[7] 3GPP TS 36.212, Evolved Universal Terrestrial Radio Access (E-UTRA); "Multiplexing and Channel Coding (Release 10)"
[8] 3GPP TS 36.101, Evolved Universal Terrestrial Radio Access (E-UTRA); "User Equipment (UE) Radio Transmission and Reception (Release 10)"
[9] 3GPP TS 36.124, Evolved Universal Terrestrial Radio Access (E-UTRA); "Physical Layer-Measurements (Release 10)"
[10] 3GPP TR 25.913, "Requirements for Evolved UTRA (E-UTRA) and Evolved UTRAN (E-UTRAN) (Release 7)"
[11] USPTO Patent Application US2010/0002643 A1, "Apparatus and Method for Inter-Cell Interference Cancellation in MIMO Wireless Communication System"
[12] USPTO Patent Application US2010/0208854 A1, "Iterative Interference Cancellation for MIMO-OFDM Receivers"
[13] Patent Application WO2010/094001 A2, "Method and Apparatus for Inter-Sector MIMO"
[14] R. Y. Chang, Z. Tao, J. Zhang, C. C. Jay Kuo, "A Graph Approach to Dynamic Fractional Frequency Reuse (FFR) in Multi-Cell OFDMA Networks", IEEE ICC 2009

[15] Patent Application U.S.2009/034437 A1, "Apparatus and method for canceling interference in relay station in a communication system"

The invention claimed is:

1. A method to minimize inter-cell interference in an Orthogonal Frequency Division Multiple Access (OFDMA) network, wherein a user device detects interferences of a single dominant interferer of a neighbour base station, said user device provided with at least two antennas and said user device connected to a main base station, said main base station introducing a pattern of transmission gaps for certain Resource Elements in the Resource Element mapping function by switching off the transmission characterised in that said certain Resource Elements in the Resource Element mapping function are introduced for the PDSCH complex symbols, the method comprising performing the following steps:

employing, said neighbour base station and said main base station, transmission modes TM1 or TM7 for at least said certain Resource Elements;

coordinating base stations that constitute said OFDMA network in order to allow the transmission in said certain Resource Elements only to said neighbour base station and to said main base station;

receiving in said user equipment the signals by said at least two antennas in said certain resource elements corresponding to the following expression:

$$r_1 = h_{11}^i \cdot i + n_1;$$

$$r_2 = h_{21}^i \cdot i + n_2;$$

where $r_1$ and $r_2$ are said signals received by said at least two antennas;

i is said single dominant interferer;

$n_1$ and $n_2$ are AWGN terms received by said at least two antennas; and $h_{11}^i$ and $h_{21}^i$ are the frequency response components associated to said single dominant interferer as seen by said at least two antennas; and calculating in said user equipment the signal received to at least partially cancel said single dominant interferer according to the following expression:

$$r' = h_{\mathit{eff}} \cdot s + n'$$

where r' is the signal received by said user equipment to at least partially cancel said single dominant interferer;

s is the signal sent from said main base station to said user equipment;

n' is a noise term combination of the noise signals received by said at least two antennas of said user equipment;

$h_{\mathit{eff}}$ is an effective channel complex factor and $h_{\mathit{eff}} = h_{11}^s - f \cdot h_{21}^s$;

$h_{11}^s$ and $h_{21}^s$ are the frequency response components associated to the signal sent from said main base station as seen by said at least two antennas; and $$f = h_{11}^i / h_{21}^i.$$

2. The method as per claim 1, comprising performing said method steps to each antenna pairs when said user equipment has a plurality of antennas, having as many effective channel complex factors as antenna pairs.

3. The method as per claim 1, comprising locating said certain resource elements in symbol 2 for the first slot of each subframe and symbol 3 for the second slot of each subframe in case of using normal Cyclic Prefix, or in symbol 2 for all slots in case of using extended Cyclic Prefix.

4. The method as per claim 3, further comprising locating said certain resource elements in the following subcarriers:

$$k = 6 \cdot m + (v + v_{\mathit{shift}}) \bmod 6$$

where k is the number of the subcarrier;

$m = 2 \cdot RB_{min}, 2 \cdot RB_{min} + 1, \ldots, 2 \cdot (RB_{min} + N_{RB}) - 1$;

$RB_{min}$ is the minimum resource block number;

$N_{RB}$ is the number of resource blocks scheduled for said user equipment;

v is equal to 0 for even slots and equal to 3 for odd slots;

$v_{\mathit{shift}}$ is the corresponding frequency shift of cell reference signals, given by $N_{ID}^{\mathit{cell}} \bmod 6$ where $N_{ID}^{\mathit{cell}}$ represents the cell identity; and mod is the operation module.

5. The method as per claim 4, comprising applying said pattern of transmission gaps to resource elements not reserved for transmission of regular control channels or signals.

6. The method as per claim 1, comprising performing said coordination by means of X2 interface.

7. The method as per claim 6, comprising:

deciding, said main base station, performing said method steps according to channel quality indicators and/or measurement reports sent from said user equipment to said main base station; and communicating, said main base station, said decision to said user equipment by means of the Physical Downlink Control Channel.

8. The method as per claim 7, further comprising:

deciding, said main base station, performing said method steps if said user equipment is in cell-edge conditions; and/or falling back to a normal mode of operation of said main base station if said channel quality indicators are not improved when performing said method steps.

9. The method as per claim 2, comprising locating said certain resource elements in symbol 2 for the first slot of each subframe and symbol 3 for the second slot of each subframe in case of using normal Cyclic Prefix, or in symbol 2 for all slots in case of using extended Cyclic Prefix.

10. The method as per claim 9, further comprising locating said certain resource elements in the following subcarriers:

$$k = 6 \cdot m + (v + v_{\mathit{shift}}) \bmod 6$$

where k is the number of the subcarrier;

$m = 2 \cdot RB_{min}, 2 \cdot RB_{min} + 1, \ldots, 2 \cdot (RB_{min} + N_{RB}) - 1$;

$RB_{min}$ is the minimum resource block number;

$N_{RB}$ is the number of resource blocks scheduled for said user equipment;

v is equal to 0 for even slots and equal to 3 for odd slots;

$v_{\mathit{shift}}$ is the corresponding frequency shift of cell reference signals, given by $N_{ID}^{\mathit{cell}} \bmod 6$ where $N_{ID}^{\mathit{cell}}$ represents the cell identity; and mod is the operation module.

11. The method as per claim 10, comprising applying said pattern of transmission gaps to resource elements not reserved for transmission of regular control channels or signals.

* * * * *